US011509806B2

(12) United States Patent
Nikhara et al.

(10) Patent No.: US 11,509,806 B2
(45) Date of Patent: Nov. 22, 2022

(54) UNDER-DISPLAY CAMERA SYNCHRONIZATION WITH DISPLAY PIXEL OPERATION

(71) Applicant: QUALCOMM Incorporated, San Diego, CA (US)

(72) Inventors: Soman Ganesh Nikhara, Hyderabad (IN); Edwin Chongwoo Park, San Diego, CA (US); Bapineedu Chowdary Gummadi, Hyderabad (IN); Ravi Shankar Kadambala, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 200 days.

(21) Appl. No.: 17/069,683

(22) Filed: Oct. 13, 2020

(65) Prior Publication Data
US 2022/0116519 A1 Apr. 14, 2022

(51) Int. Cl.
H04N 5/225 (2006.01)
G09G 3/3208 (2016.01)
(Continued)

(52) U.S. Cl.
CPC ......... *H04N 5/2257* (2013.01); *G09G 3/3208* (2013.01); *G09G 5/12* (2013.01);
(Continued)

(58) Field of Classification Search
CPC ...... H04N 5/2257; H04N 5/04; H04N 5/2354; G09G 3/3208; G09G 5/12; G09G 2360/16
See application file for complete search history.

(56) References Cited

U.S. PATENT DOCUMENTS

2007/0002130 A1 1/2007 Hartkop
2008/0165267 A1 7/2008 Cok
(Continued)

FOREIGN PATENT DOCUMENTS

CN 208924293 U 5/2019
WO 2019213839 A1 11/2019
(Continued)

OTHER PUBLICATIONS

Gartenberg C., "Xiaomi Explains More About How its Under-Screen Camera Actually Works", The Verge, Circuit Breaker, Jun. 5, 2019, 2 pages.
(Continued)

Primary Examiner — Twyler L Haskins
Assistant Examiner — Fayez A Bhuiyan
(74) Attorney, Agent, or Firm — Qualcomm Incorporated

(57) ABSTRACT

An example image capture device includes memory configured to store display content and image information received from a camera sensor, the camera sensor being configured to receive light through at least a portion of a display. The image capture device includes one or more processors coupled to the memory. The one or more processors are configured to determine a camera sensor blanking period. The one or more processors are configured to control the display to display content via one or more of a plurality of pixels in the at least a portion of the display during the camera sensor blanking period. The one or more processors are configured to control the display to not display content via the one or more of the plurality of pixels outside of the camera sensor blanking period.

29 Claims, 11 Drawing Sheets

(51) Int. Cl.
    *G09G 5/12*      (2006.01)
    *H04N 5/04*      (2006.01)
    *H04N 5/235*     (2006.01)
(52) U.S. Cl.
    CPC ............. *H04N 5/04* (2013.01); *H04N 5/2354* (2013.01); *G09G 2360/16* (2013.01)

(56)                References Cited

U.S. PATENT DOCUMENTS

2009/0102763 A1    4/2009  Border et al.
2020/0135147 A1    4/2020  Tang et al.

FOREIGN PATENT DOCUMENTS

WO    WO-2019213839 A1 *  11/2019   ............. G06F 3/041
WO       2020011256 A1     1/2020
WO       2020125278 A1     6/2020

OTHER PUBLICATIONS

International Search Report and Written Opinion—PCT/US2021/049898—ISA/EPO—Dec. 20, 2021 13 Pages.

* cited by examiner

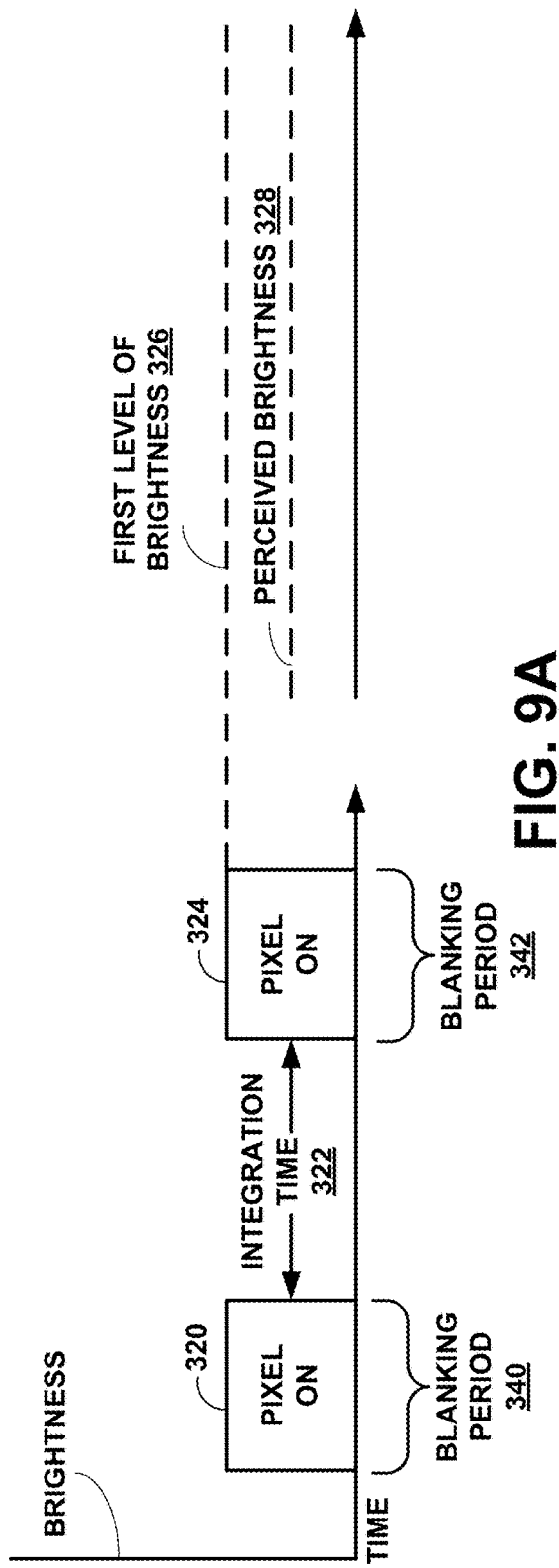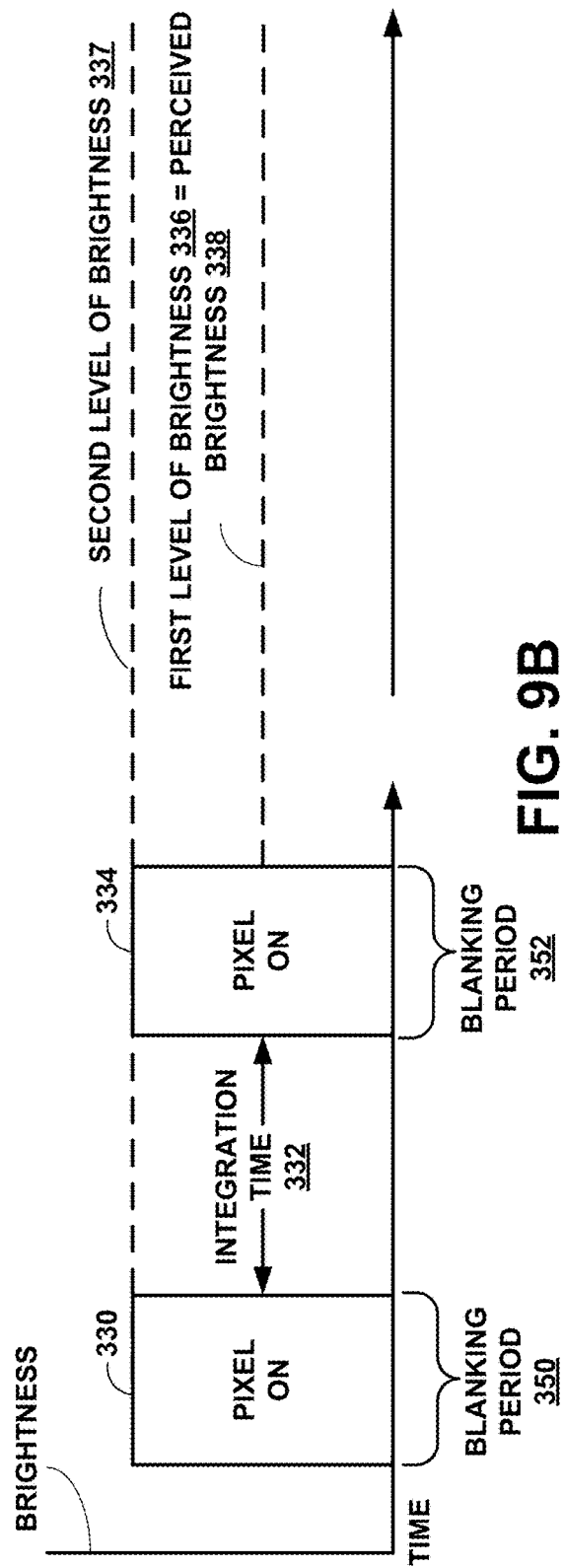

UNDER-DISPLAY CAMERA SYNCHRONIZATION WITH DISPLAY PIXEL OPERATION

TECHNICAL FIELD

This disclosure generally relates to image capture devices.

BACKGROUND

Image capture devices (e.g., digital cameras) are commonly incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication devices such as mobile phones (including cellular or satellite radio phones), camera-equipped tablets or personal digital assistants (PDAs), computer devices that include cameras such as so-called "web-cams," virtual reality and/or augmented reality head mounted devices, or any devices with digital imaging or video capabilities.

SUMMARY

In general, this disclosure describes techniques for displaying content while a camera is on in an image capture device having a camera sensor disposed under a display. As used herein, "content" may include image(s) captured by the image capture device, visual representations of files stored in a memory location, software applications, user interfaces including GUIs, network-accessible content objects, images received by, but not captured by the image capture device (e.g., downloaded images, images sent by text message, images sent by email, images sent through an application, etc.), background images, and other information. Also, as used herein, a camera sensor being disposed under a display means that the camera sensor is configured to receive light through at least a portion of the display. Such a camera sensor may also be referred to herein as an under-display camera.

One way to maximize display size on an image capture device is to place one or more camera sensors underneath the display such that the one or more camera sensors receive light passing through at least a portion of the display. In some examples, the display may be a liquid crystal display (LCD), a light-emitting diode (LED) display, an organic light-emitting diode (OLED) display, an active matrix organic light-emitting diode (AMOLED), or other display. When a camera sensor is located such that the camera sensor receives light passing through at least a portion of the display and the display is displaying content, light which otherwise may be received by the camera sensor may be scattered. For example, when one or more pixels in a region over the camera sensor are active or being addressed, less light may reach the camera sensor through the display than may reach the camera sensor when no pixels in the region over the camera sensor are active or being addressed. Thus, the scattered light may attenuate the light reaching the camera sensor. The attenuated light may decrease image quality of the captured image.

This disclosure describes techniques for avoiding or mitigating the attenuation of received light caused by the displayed content. This disclosure also describes techniques for avoiding degrading the quality of displayed content while avoiding or mitigating the attenuation of received light caused by the displayed content.

In one example, this disclosure describes an image capture device including memory configured to store display content and image information received from a camera sensor, the camera sensor being configured to receive light through at least a portion of a display, and one or more processors being coupled to the memory, the one or more processors being configured to: determine a camera sensor blanking period; control the display to display content via one or more of a plurality of pixels in the at least a portion of the display during the camera sensor blanking period; and control the display to not display content via the one or more of the plurality of pixels outside of the camera sensor blanking period.

In another example of this disclosure, a method includes determining a camera sensor blanking period, the camera sensor blanking period being associated with a camera sensor configured to receive light through at least a portion of a display, displaying content via one or more of a plurality of pixels in the at least a portion of the display during the camera sensor blanking period, and refraining from displaying content via the one or more of the plurality of pixels outside of the camera sensor blanking period.

In another example, this disclosure describes a non-transitory computer-readable storage medium storing instructions that, when executed, cause one or more processors to determine a camera sensor blanking period, the camera sensor blanking period being associated with a camera sensor configured to receive light through at least a portion of a display, control the display to display content via one or more of a plurality of pixels in the at least a portion of the display during the camera sensor blanking period, and control the display to not display content via the one or more of the plurality of pixels outside of the camera sensor blanking period.

In another example, an image capture device includes means for determining a camera sensor blanking period, the camera sensor blanking period being associated with a camera sensor configured to receive light through at least a portion of a display, means for controlling the display to display content via one or more of a plurality of pixels in the at least a portion of the display during the camera sensor blanking period, and means for controlling the display to not display content via the one or more of the plurality of pixels outside of the camera sensor blanking period.

The details of one or more aspects of the disclosure are set forth in the accompanying drawings and the description below. Other features, objects, and advantages of the techniques described in this disclosure will be apparent from the description, drawings, and claims.

BRIEF DESCRIPTION OF DRAWINGS

FIG. 5 is a conceptual diagram depicting an example technique for displaying content in an image capture device having an under-display camera sensor while a camera is on.

FIGS. 9A and 9B are conceptual diagrams illustrating example display techniques according to this disclosure.

DETAILED DESCRIPTION

Figure 1:
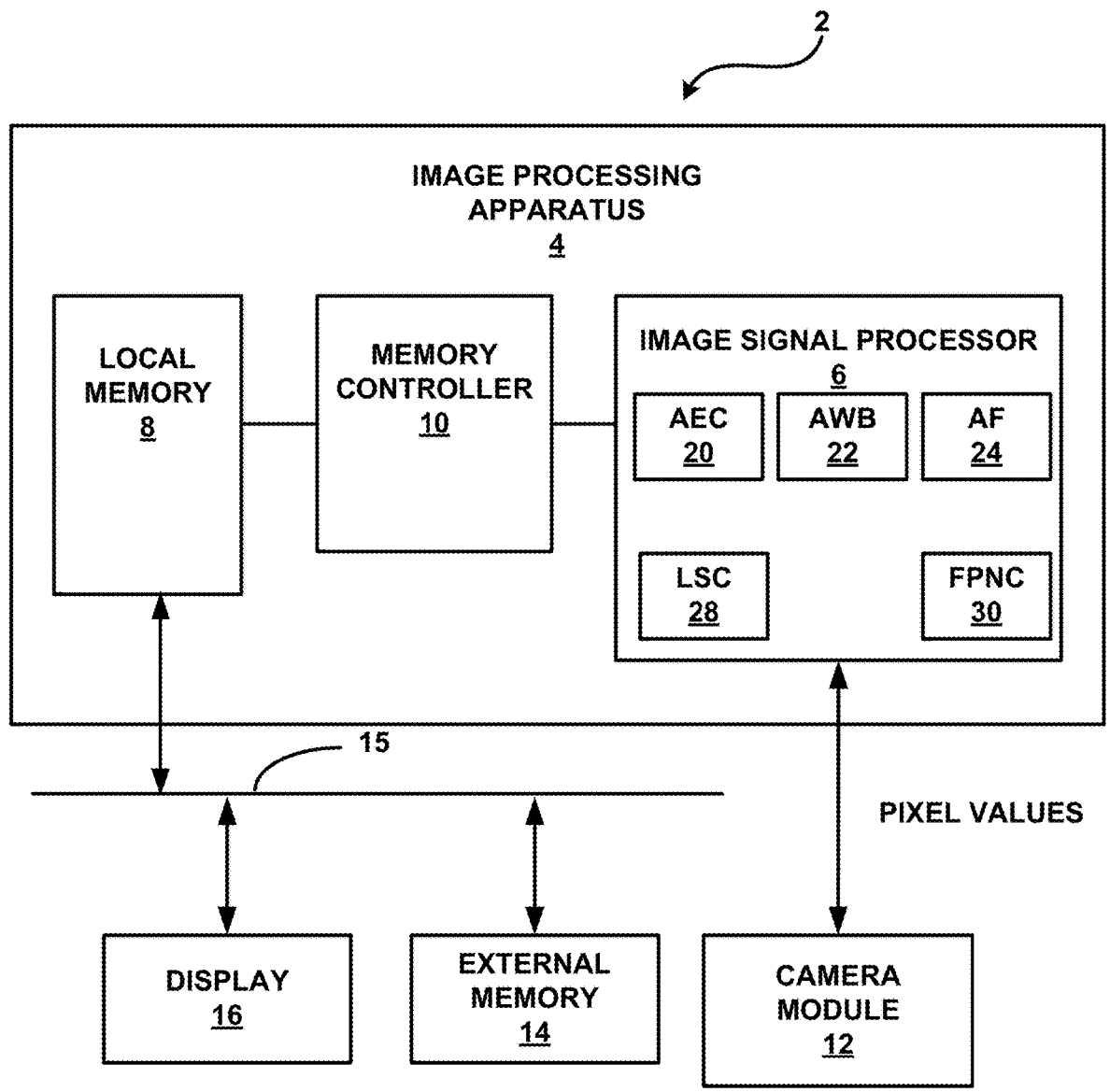
FIG. 1 is block diagram of an exemplary image capture device that is configured to implement techniques of this disclosure.

This disclosure describes techniques for displaying an image in a display while a camera is on in an image capture device having an under-display camera sensor. The display may use a transparent material with a pixel structure designed so that light can penetrate through the display to the camera sensor. A camera sensor used in such a manner may be larger than other front-facing "selfie" cameras and may have a wider aperture lens. Additionally, a plurality of camera sensors may be disposed under the display. For example, the number of camera sensors and/or the camera sensor size need not be limited or constrained by a bezel or border space surrounding the display. By locating a camera sensor such that the camera sensor receives light through at least a portion of a display (e.g., under the display) on a device, the size of the usable display space may be enlarged when compared to a similar sized device with space on the front of the device dedicated for a camera sensor(s). Alternatively, a smaller form factor may be used to provide the same usable display size. For example, a larger bezel may not be needed when a camera sensor(s) is located such that the camera sensor receives light through at least a portion of a display (e.g., under the display), as the camera sensor(s) is not located on the bezel, but under the display. This facilitates the use of a smaller form factor to achieve the same usable display size. Additionally, by locating a camera sensor such that the camera sensor receives light through at least a portion display (e.g., under the display), the camera sensor may be placed anywhere under the display. For example, the camera sensor may be located where a user's eyes may be directed to when taking a "selfie." In this manner, the gaze of the eyes in the image captured by the camera sensor may appear to be looking at the camera and not under the camera as may occur with camera sensors being located above the display or near the top of the image capture device. While the techniques of this disclosure are generally described herein with respect to a "selfie" camera, the techniques of this disclosure may also apply to a rear facing camera located under a display on a device.

In many image capture devices, it may be desirable to maximize the size of the display on the image capture device. This is particularly the case with smaller image capture devices, such as mobile phones and other mobile devices. Many image capture devices (e.g., mobile devices) include a front-facing camera (a "selfie" camera) that faces towards the user of the mobile device. Maximizing display size on image capture devices with a front-facing camera(s) is not without limitations. Front-facing cameras have been located on the front face of an image capture device between the edge of the device and the edge of the display. To maximize display size on image capture devices having front-facing cameras, some manufacturers have enlarged the display and introduced a notch in the display to avoid covering the camera sensor with the display. Others have enlarged the display to substantially cover the front face of the image capture device and added a pop-up camera rather than place the camera sensor on the body of the image capture device.

One way to maximize display size is to locate a camera sensor under the display (e.g., in a manner such that the camera sensor receives light through at least a portion of the display). However, by locating the camera sensor under the display, the display may cause attenuation, spatial strides and shadows, light scattering or diffusion, and/or other undesirable effects in the image signal captured by the camera sensor, particularly when the display is displaying content. For example, some or all of the sub-pixels directly above the camera sensor may be actively displaying content and the camera sensor may receive less light than the camera sensor would if the sub-pixels directly above the camera sensor were not actively displaying content, which may result in a poor quality image being captured by the camera sensor.

In some image capture devices, a technique may be employed to attempt to lessen the impact of light attenuation through the display when the display is actively displaying content on the captured image quality. For example, some image capture devices may only address or turn on a subset of the pixels above the camera sensor during the display of an image. While this may lessen the amount of attenuation of light received by the camera sensor due to the displayed content, this also may negatively impact the quality of the displayed content in the area over the camera sensor, as fewer pixels are used to display the content in that area than the rest of the display. The use of fewer pixels to display content may lead to a blockiness effect or lack of detail in that area of the display compared to other areas of the display. This use of fewer pictures to display content over the camera sensor may be aesthetically unpleasant and/or distracting to a user.

The techniques of this disclosure may be used separately or in any combination. According to the techniques of this disclosure, in one example, an image capture device may include memory configured to store display content and image information received from a camera sensor, the camera sensor being configured to receive light through at least a portion of a display. The image capture device may include one or more processors coupled to the memory. The one or more processors may be configured to determine a camera sensor blanking period, control the display to display content via one or more of a plurality of pixels in the at least a portion of the display during the camera sensor blanking period, and control the display to not display content via the one or more of the plurality of pixels outside of the camera sensor blanking period.

According to the techniques of this disclosure, in another example, an image capture device may include memory configured to store display content and image information received from a camera sensor, the camera sensor being configured to receive light through at least a portion of a display. The image capture device may include one or more processors coupled to the memory. The one or more processors may be configured to determine a first level of brightness of the one or more of the plurality of pixels. The one or more processors may be configured to determine a second level of brightness of the one or more of the plurality of pixels. The one or more processors may be configured to control the display to display content via the one or more of the plurality of pixels at the second level of brightness during the camera sensor blanking period. The second level of brightness may be greater than the first level of brightness and be based at least in part on the first level of brightness.

FIG. 1 is a block diagram illustrating a device 2 that may be configured to perform the techniques of this disclosure. Device 2 may form all or part of an image capture device, or a digital video device capable of coding and transmitting and/or capturing still images and/or video sequences. By way of example, device 2 may form part of a wireless mobile communication device such as a cellular phone or satellite radio phone, a smartphone, a stand-alone digital camera or video camcorder, a personal digital assistant (PDA), a tablet computer, a laptop computer, or any device with imaging or video capabilities in which image processing is desirable.

As shown in FIG. 1, device 2 includes an image processing apparatus 4 to store raw image data and perform various processing techniques on such data. Image processing apparatus 4 may comprise one or more integrated circuits that include a digital signal processor (DSP), on-chip memory, and possibly hardware logic or circuitry. More generally, image processing apparatus 4 may comprise any combination of processors, hardware, software or firmware, and the various components of image processing apparatus 4 may be implemented as such. Also, image processing apparatus 4 may comprise a single integrated chip or an encoder/decoder (CODEC), if desired.

In the illustrated example of FIG. 1, image processing apparatus 4 includes a local memory 8, a memory controller 10 and an image signal processor 6. Image signal processor 6 may be a general-purpose processing unit or may be a processor specially designed for imaging applications, for example, for a handheld electronic device. As shown, image signal processor 6 is coupled to local memory 8 and external memory 14 via memory controller 10. In some examples, local memory 8 may be incorporated in image signal processor 6, for example, as cache memory.

As shown in FIG. 1, image signal processor 6 may be configured to execute an auto exposure control (AEC) process 20, an auto white balance (AWB) process 22, an auto focus (AF) process 24, a lens shade compensation (LSC) process 28 and/or a fixed pattern noise compensation (FPNC) process 30. In some examples, image signal processor 6 may include hardware-specific circuits (e.g., an application-specific integrated circuit (ASIC)) configured to perform the AEC process 20, AWB process 22, AF process 24, LSC process 28 and/or FPNC process 30. In other examples, image signal processor 6 may be configured to execute software and/or firmware to perform the AEC process 20, AWB process 22, AF process 24, LSC process 28 and/or FPNC process 30. When configured in software, code for AEC process 20, AWB process 22, AF process 24, LSC process 28 and/or FPNC process 30 may be stored in local memory 8 and/or external memory 14. In other examples, image signal processor 6 may perform the AEC process 20, AWB process 22, AF process 24, LSC process 28 and/or FPNC process 30 using a combination of hardware, firmware, and/or software. When configured as software, AEC process 20, AWB process 22, AF process 24, LSC process 28 and/or FPNC process 30 may include instructions that configure image signal processor 6 to perform various image processing and device management tasks.

AEC process 20 may include instructions for configuring, calculating, storing, and/or applying an exposure setting of a camera module 12. An exposure setting may include the shutter speed (e.g., how long camera module 12 may capture an image) and aperture setting to be used to capture images. In accordance with techniques of this disclosure, image signal processor 6 may use depth information received by a depth sensor (not shown) of camera module 12 to better identify the subject of an image and make exposure settings based on the identified subject. AF process 24 may include instructions for configuring, calculating, storing, and/or applying an auto focus setting of camera module 12.

AWB process 22 may include instructions for configuring, calculating, storing and/or applying an AWB setting (e.g., an AWB gain) that may be applied to one or more images captured by camera module 12. In some examples, the AWB gain determined by AWB process 22 may be applied to the image from which the AWB gain was determined. In other examples, the AWB gain determined by AWB process 22 may be applied to one or more images that are captured after the image from which the AWB gain was determined. Hence, AWB gain may be applied to a second image captured subsequently to the first image from which the AWB gain is determined. In one example, the second image may be the image captured immediately after the first image from which the AWB gain was determined. That is, if the first image is frame N, the second image to which the AWB gain is applied is frame N+1. In other examples, the second image may be the image captured two images after the first image from which the AWB gain was determined. That is, if the first image is frame N, the second image to which the AWB gain is applied is frame N+2. In other examples, the AWB gain may be applied to images captured further in time from the first image (e.g., frame N+3, frame N+4, etc.). In other examples, the AWB gain may be applied to first image from which the AWB gain is determined.

LSC process 28 may include instructions for configuring, calculating, storing and/or applying a lens shade compensation gain. For example, LSC process 28 may compensate for light falling-off towards the edges of an image due to a camera lens.

FPNC process 30 may include instructions for configuring, calculating, storing and/or applying an FPN compensation process. For example, FPNC process 30 may subtract a master dark frame from the captured image to compensate for FPN.

Local memory 8 may store raw image data and may also store processed image data following any processing that is performed by image signal processor 6. Local memory 8 may be formed by any of a variety of non-transitory memory devices, such as dynamic random-access memory (DRAM), including synchronous DRAM (SDRAM), magnetoresistive RAM (MRAM), resistive RAM (RRAM), or other types of memory devices. Memory controller 10 may control the memory organization within local memory 8. Memory controller 10 also may control memory loads from local memory 8 to image signal processor 6 and write backs from image signal processor 6 to local memory 8. The images to be processed by image signal processor 6 may be loaded directly into image signal processor 6 from camera module 12 following image capture or may be stored in local memory 8 during the image processing.

As noted, device 2 may include a camera module 12 to capture the images that are to be processed, although this disclosure is not necessarily limited in this respect. Camera module 12 may comprise arrays of solid-state sensor elements such as complementary metal-oxide semiconductor (CMOS) sensor elements, charge coupled device (CCD) sensor elements, or the like. Alternatively, or additionally, camera module 12 may comprise a set of image sensors that include color filter arrays (CFAs) arranged on a surface of the respective sensors. Camera module 12 may be coupled directly to image signal processor 6 to avoid latency in the image processing. Camera module 12 may be configured to capture still images, or full motion video sequences, in which case the image processing may be performed on one or more image frames of the video sequence.

Camera module 12 may send pixel values (e.g., in a Bayer or red green blue (RGB) format), and/or raw statistics messages describing the captured image to image signal processor 6. In some examples, the pixel values may contain information relating to a level of brightness of the each of the pixels. In general, image signal processor 6 may be configured to analyze the raw statistics and depth information to calculate and/or determine imaging parameters, such as sensor gain, R/G/B gain, AWB gain, shutter speed, aperture size, and the like. The calculated and/or determined imaging parameters may be applied to the captured image, applied to one or more subsequently captured images, and/or sent back to camera module 12 to adjust exposure and/or focus setting.

In some examples, the first level of brightness may be a level of brightness device 2 may display for a given pixel when a camera of device 2 is off. For example, the first level of brightness of a pixel may be a level of brightness captured by camera module 12, a level of brightness captured by camera module 12 and image processed by image signal processor 6 (e.g., by AWB process 22), or a level of brightness stored in memory. In some examples, rather than obtain a first level of brightness for a pixel from the pixel value in camera module 12 or from image signal processor 6, device 2 may determine a first level of brightness based on the level of brightness from one or more pixels outside of the area above camera module 12. For example, device 2 may determine the first level of brightness for the pixel by determining a level of brightness for a pixel outside of the area immediately above camera module 12. In another example, one or more processors 110 may determine the first level of brightness for the pixel by determining an average level of brightness for a plurality of pixels outside of the area above camera module 12.

Device 2 may include a display 16 that is configured to display content. In some examples, the display content may be an image captured by camera module 12. After image processing of the captured, by image signal processor 6, the image may be written to local memory 8 or external memory 14. The processed image may then be sent to display 16 for presentation to the user. Display 16 may additionally, or alternatively, display other information, including visual representations of files stored in a memory location (e.g., external memory 14), software applications installed in image signal processor 6, user interfaces including GUIs, network-accessible content objects, images received by, but not captured by the image capture device (e.g., downloaded images, images sent by text message, images sent by email, images sent through an application, etc.), background images, and other information. Display 16 may display the content at a frame rate. For example, display 16 may display 30 frames per second (fps). Each frame displayed may have a display frame length, i.e., a length of time the frame is displayed, equal to the inverse of the frame rate (e.g., one divided by the frame rate). For example, if display 16 has a frame rate of 30 fps, the length of each display frame is approximately 0.0333 seconds.

In some examples, device 2 may include multiple memories. For example, device 2 may include external memory 14, which typically comprises a relatively large memory space. External memory 14, for example, may comprise DRAM or FLASH memory. In other examples, external memory 14 may comprise a non-volatile memory or any other type of data storage unit. In contrast to external memory 14, local memory 8 may comprise a smaller and faster memory space, although this disclosure is not necessarily limited in this respect. By way of example, local memory 8 may comprise SDRAM. In any case, external memory 14 and local memory 8 are merely exemplary, and may be combined into the same memory part, or may be implemented in any number of other configurations.

Device 2 may also include a transmitter (not shown) to transmit the processed images or coded sequences of images to another device. Indeed, the techniques of this disclosure may be used in handheld wireless communication devices (such as smartphones) that include digital camera functionality or digital video capabilities. In that case, the device would also include a modulator-demodulator (MODEM) to facilitate wireless modulation of baseband signals onto a carrier waveform in order to facilitate wireless communication of the modulated information.

Local memory 8, display 16 and external memory 14 (and other components if desired) may be coupled via a communication bus 15. A number of other elements may also be included in device 2, but are not specifically illustrated in FIG. 1 for simplicity and ease of illustration. The architecture illustrated in FIG. 1 is merely exemplary, as the techniques described herein may be implemented with a variety of other architectures.

Device 2 represents an example image capture device including a camera sensor configured to receive light through at least a portion of a display, the display including a plurality of pixels and being configured to display content via the plurality of pixels, memory configured to store display content, and one or more processors coupled to the camera sensor, the display, and the memory, the one or more processors being configured to: determine a camera sensor blanking period; and control the display to display content via one or more of the plurality of pixels in the at least a portion of the display during the camera sensor blanking period.

FIGS. 2A-2D are block diagrams showing examples of image capture devices (such as smartphones). Each image capture device of FIGS. 2A-2D may be an example of device 2. Each image capture device is depicted with a display and a front-facing camera sensor. In this context, a front-facing camera sensor is a camera sensor that faces the user of image capture device in typical operation. For example, a front-facing camera sensor is typically on the same side of the device as the main display. Each front-facing camera sensor may be a part of a camera module, such as camera module 12. For example, in FIG. 2A, image capture device 200 includes display 202, camera sensor 204 and button 206. Button 206 may serve multiple purposes, such as to wake up image capture device 200, change what is being displayed on display 202, etc. As can be seen, button 206 and camera sensor 204 take up space on the front of image capture device 200. By locating camera sensor 204 and button 206 on the front of image capture device 200, less area is available for display 202.

Figure 2:
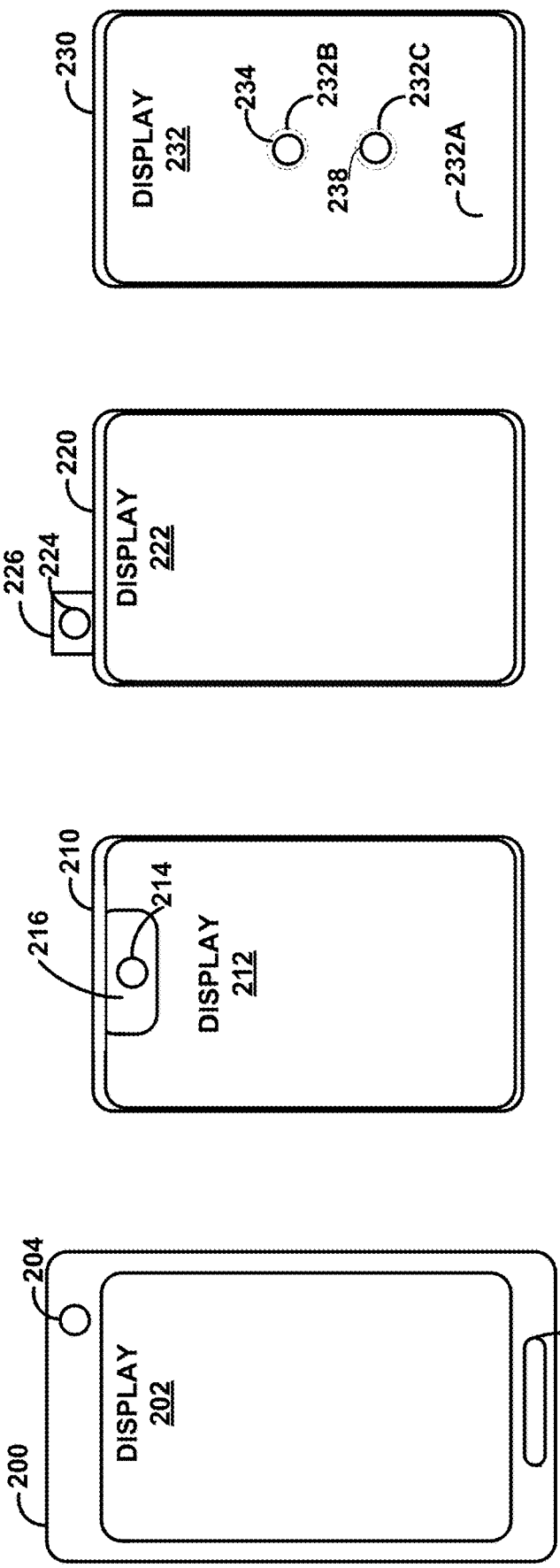
FIGS. 2A-2D are block diagrams showing examples of image capture devices having front-facing camera sensors and displays.

In the example of FIG. 2B, image capture device 210, on the other hand does not have a button on the front. In this case the button may be on the side or the functions of the button may be included in display 212 (e.g., through a touch display interface). Image capture device 210 is depicted with camera sensor 214 and notch 216. Notch 216 may be an area removed from the display before assembly of image capture device 210. In this example, the area covered by notch 216 is therefore not part of display 212 and does not display content. Notch 216 may be employed in order to increase the ratio of front side of image capture device 210 occupied by display 212 when compared to image capture device 200 of FIG. 2A.

In the example of FIG. 2C, image capture device 220 has a display 222 and a pop-up camera 226. Camera sensor 224 may be contained in pop-up camera 226. In the example of image capture device 220, the entirety of display 222 may display content and there is no notch, such as in image capture device 210 of FIG. 2B.

In the example of FIG. 2D, image capture device 230 has a display 232 and a camera sensor 234. In some examples, image capture device 230 may have more than one camera sensor. For example, image capture device 230 may have camera sensor 234 and camera sensor 238. Image capture device 230 may comprise or be an example of device 2 and display 232 may be an example of display 16. In the example of image capture device 230 of FIG. 2D, unlike the examples of FIGS. 2A-2C, camera sensor 234 and camera sensor 238 are disposed below display 232. In some examples, a portion of, rather than all of, camera sensor 234 or camera sensor 238 may be disposed below display 232. Display 232 may comprise transparent layers. Region 232A of display 232, 232B of display 232, and region 232C of display 232 will be discussed further with respect to FIGS. 5, 7, 8A, 8B and 9. While the techniques of this disclosure are generally described with reference to an image capture device with a camera sensor disposed below a display, such as image capture device 230, the techniques of this disclosure may be used with other image capture devices, such as image capture devices 200, 210 and 220 or an image capture device with a camera sensor partially disposed under a display.

Referring now to each of FIGS. 2A-2D, image capture device 200 has a larger form factor than image capture devices 210, 220 and 230, but has the same size display 202 as display 222 of image capture device 220 and display 232 of image capture device 230 and a slightly larger display 202 than display 212 of image capture device 210 due to notch 216. Image capture device 210 has the same size form factor as image capture devices 220 and 230, but it has less usable display space on display 212 due to notch 216. Additionally, notch 216 may be distracting to some users. Image capture device 220 has the same form factor and usable display size as image capture device 230; however, image capture device 220 has moveable parts in pop-up camera 226. These moveable parts may become broken or jammed with repeated use or with a user dropping image capture device 220 onto a hard surface. Therefore, it may be desirable to locate the camera sensor beneath the display as locating the camera sensor under the display may maximize display space while avoiding notching and moving mechanical parts.

Additionally, with image capture device 230 of FIG. 2D, camera sensor 234 may be located anywhere underneath display 232. In this example, camera sensor is shown located in the middle of display 232. Such a location may be desirable over the locations of the front-facing camera sensors in image capture device 200, image capture device 210 and image capture device 220. For example, a user trying to take a "selfie" may look at a live image of themselves on the display of the image capture device. The further the camera sensor is away from where the user's eyes are pointed, the more likely the image that will be captured will depict the eyes gazing away from the camera sensor. This eye gaze phenomenon may result in aesthetically unappealing images with the user's gaze appearing below (or above) where one may expect them to be looking (e.g., not towards the eyes of the viewer of the image, but downwards (or upwards) from the eyes of the viewer of the image, such as under or over the head of the viewer of the image).

Figure 3:
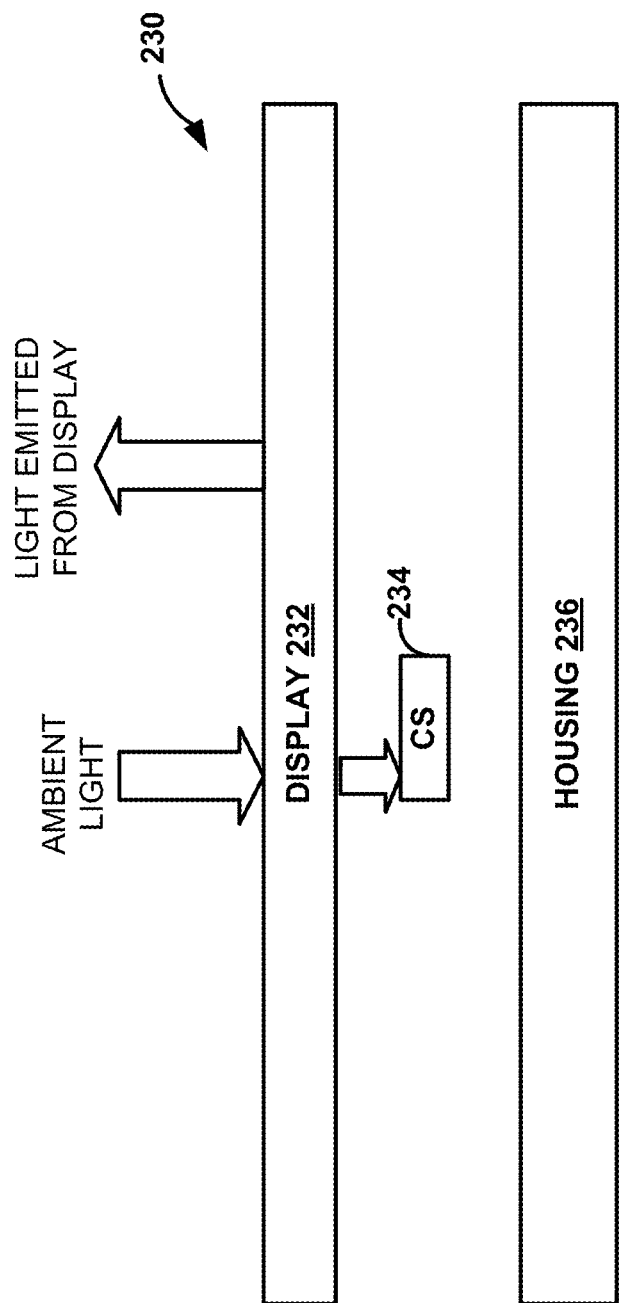
FIG. 3 is a block diagram showing an exploded cross-sectional view of an example image capture device that is configured to implement techniques of this disclosure.

FIG. 3 is a block diagram of an exploded side view of an example of image capture device 230 as shown in FIG. 2D. For simplicity purposes, camera sensor 238 is not shown in FIG. 3 or the remaining figures and may function similarly to camera sensor 234 as described herein. In the example of FIG. 3, image capture device 230 includes display 232, camera sensor (CS) 234 and housing 236. Housing 236 may include electronic circuit boards, processors, memory, battery, radio frequency circuitry, antennas and other components. As shown, display 232 is disposed above camera sensor 234 and camera sensor 234 is disposed below or beneath display 232. In this example, as in FIG. 2D, camera sensor 234 is a front facing camera. Camera sensor 234 is configured to capture images by receiving ambient light passing through at least a portion of display 232. That is to say, camera sensor 234 may receive ambient light that passes through at least a portion of display 232 before being incident on camera sensor 234. As used herein, the camera sensor being under, below or beneath the display or the display being over the camera sensor is intended to describe the camera sensor being configured and located so as to capture images by receiving ambient light passing through at least a portion of the display, such as display 232. Display 232 may emit light towards a user and generally away from camera sensor 234 when displaying content. Camera sensor 234 may be actively capturing image(s) while or when display 232 is actively displaying content. In other words, camera sensor 234 may receive ambient light passing through at least a portion of display 232 while display 232 may emit light towards a user.

Figure 4B:
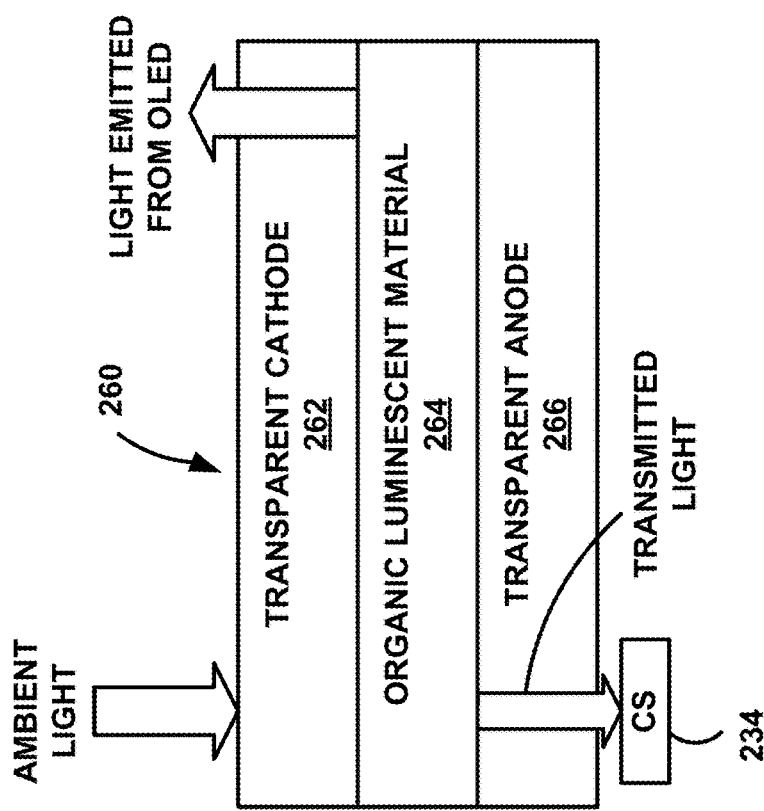
FIGS. 4A and 4B are block diagrams illustrating properties of different example organic light emitting diode (OLED) displays according to techniques of this disclosure.
Figure 4A:
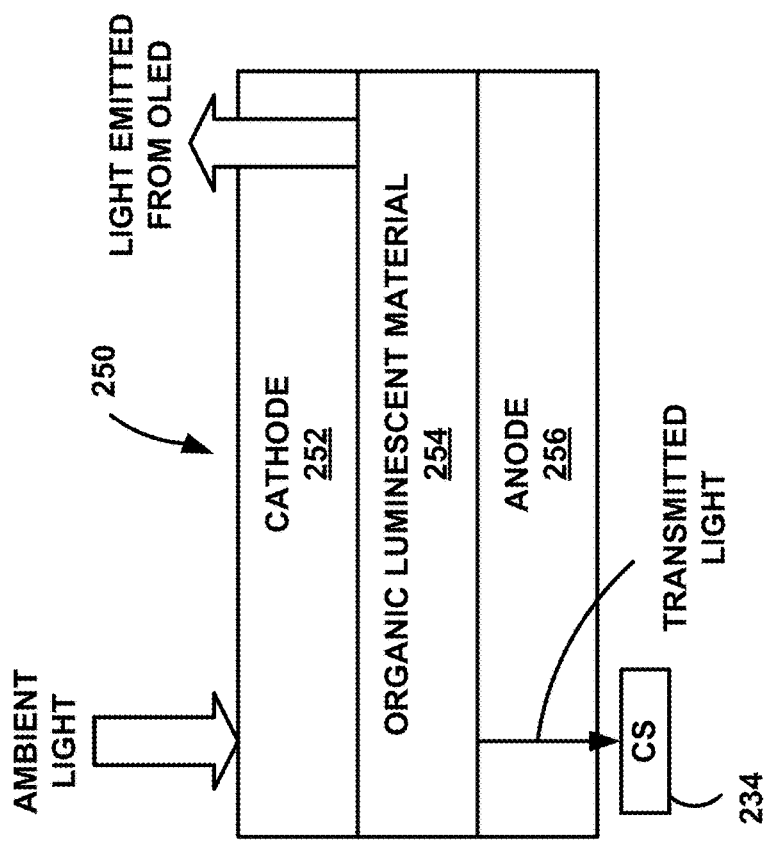

FIGS. 4A and 4B are simplified diagrams of example OLED displays that may be used in accordance with the techniques of this disclosure. While the displays of FIGS. 4A and 4B are depicted as OLED displays, the techniques of this disclosure may be used with any displays that are configured to allow light to pass through the display to a camera sensor located underneath the display, such as LCD, LED, AMOLED (which is a specific example of an OLED display), or other displays. In FIGS. 4A and 4B, while the example OLED displays are depicted with three layers, OLED displays may consist of more layers.

In the example of FIG. 4A, OLED display 250 includes cathode layer 252, organic luminescent material layer 254, and anode layer 256. For example, OLED display 250 may emit light when current is run between cathode layer 252 and anode layer 256 through organic luminescent material layer 254 causing an image(s) to appear on OLED display 250. In this manner, OLED organic luminescent material layer 254 may emit light through cathode layer 252 towards a user. In some examples, camera sensor 234 may receive ambient light at the same time that organic luminescent material layer 254 may emit light. In the example of FIG. 4A, the ambient light may strike the face of cathode layer 252. A portion of this ambient light may pass through cathode layer 252, organic luminescent material layer 254 and anode layer 256. In this example, cathode layer 252 and anode layer 256 may not be transparent. Additionally, organic luminescent material layer 254 may have RGB, RGBW (where W is white), WRGB (where W is white), RGBG (reg green blue green) or other sub-pixels that may obstruct, attenuate or distort ambient light from passing through organic luminescent material layer 254. Therefore, the amount of ambient light that passes through OLED display 250 may be relatively small (shown as transmitted light). As such, camera sensor 234 may not receive very much of transmitted light as represented by the thin arrow. This may lead to poor image quality of images captured by the camera sensor.

In the example of FIG. 4B, OLED display 260 includes transparent cathode layer 262, organic luminescent material layer 264 and transparent anode layer 266. As in the example of FIG. 4A, OLED display 260 may emit light when current is run between transparent cathode layer 262 and transparent anode layer 266 through organic luminescent material layer 264 causing an image(s) to appear on OLED display 260. In this manner, OLED organic luminescent material layer 264 may emit light through transparent cathode layer 262 towards a user. In example of FIG. 4B, much more of the ambient light may be transmitted through OLED display 260 to camera sensor 234 because both transparent cathode layer 262 and transparent anode layer 266 are transparent. Camera sensor 234 may receive the ambient light that passes through at least a portion of OLED display 260 before being incident on camera sensor 234 (shown as transmitted light as represented by the thick arrow). In some examples, camera sensor 234 may receive the ambient light at the same time that organic luminescent material layer 264 may emit light. In the example of FIG. 4B, like in the example of FIG. 4A, organic luminescent material layer 264 may contain RGB, RGBW or WRGB sub-pixels that may obstruct, attenuate or distort the ambient light passing through organic luminescent material layer 264. Overall, the attenuation or distortion in the example of FIG. 4B may be less than that of FIG. 4A, for example, due to transparent cathode layer 262 and transparent anode layer 266 being transparent. However, image quality may still be undesirable due to the sub-pixels obstructing, attenuating or distorting the ambient light.

Figure 5:
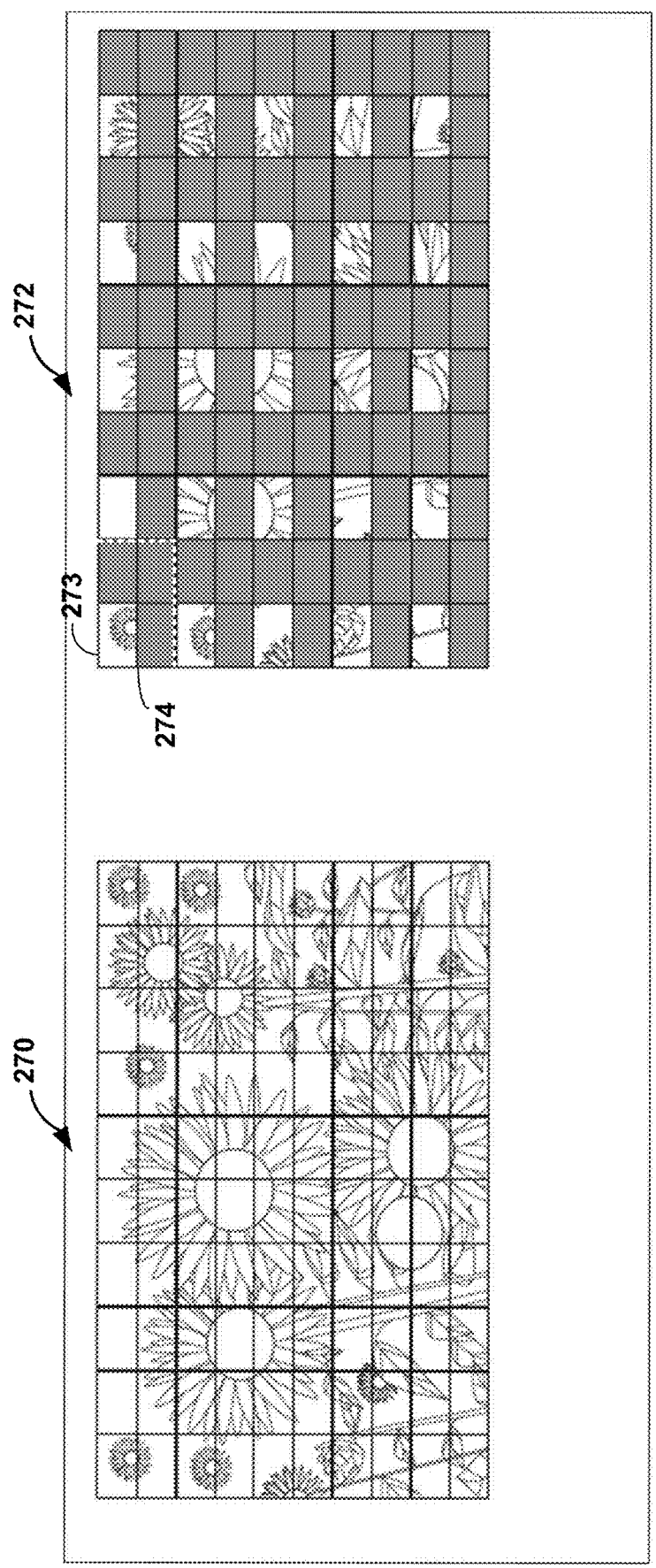

FIG. 5 is a conceptual diagram depicting an example technique for displaying content in an image capture device having an under-display camera sensor while a camera is on. When the camera is on, such as during image capture or during the execution of an image capture application (e.g., a camera application or a video application), an image capture device may turn off or not address certain display pixels above the camera sensor to improve image capture quality and reduce interference, which, for example, may come from the displayed content above the camera sensor. If camera is off, then those pixels may be used as display pixels. In some examples, the camera is on and the image capture application is on when an image capture application is executing in device 2. In some examples, the camera is off and the image capture application is off when the image capture application is not executing in device 2.

In the example of FIG. 5, one region, area, or zone of a display actively uses all pixels of the one region, area, or zone to display content while another region, area, or zone of the display may actively use only some of the pixels of the another region, area, or zone to display content. FIG. 5 depicts two different views of an image which may be displayed with each box within each view representing a pixel in a display. View 270 depicts an image that may be displayed in a region of a display, such as display 232, which may not be located above a camera sensor, such as camera sensor 234. In FIG. 2D, this region of the display is shown as region 232A. All of the pixels in region 232A may be utilized to display content, such as shown in view 270.

View 272 depicts an image that may be displayed in a region of a display above a camera sensor, such as region 232B or region 232C of FIG. 2D. In view 272, a subset of pixels is actively displaying content. In some examples, region 232B may be the same size as camera sensor 234. In other examples, region 232B may be a different size than camera sensor 234. For example, region 232B may be larger than camera sensor 234 or region 232B may be smaller than camera sensor 234. In some examples, region 232C may be the same size as camera sensor 238. In other examples, region 232C may be a different size than camera sensor 238. For example, region 232C may be larger than camera sensor 238 or region 232C may be smaller than camera sensor 238. In the example of view 272, the location of active pixels that display 232 utilizes is the top left pixel (e.g., pixel 273) of every group of four pixels (e.g., group 274 separated from the other groups of four pixels by dashed white lines) to display content and the other pixels of each group of four pixels are not utilized. The use of the top left pixel of every group of four pixels is provided as one example. Other configurations may be used.

In some examples, view 272 may be displayed in region 232B above camera sensor 234 only when the camera is on (e.g., device 2 is executing an image capture application such as a camera application or a video application) and view 270 may be displayed in region 232A. In some examples, view 272 may be displayed in region 232B above camera sensor 234 only when camera sensor 234 is actively being used to capture an image(s) and view 270 (e.g., using all the pixels) may be displayed in region 232A. In some examples, view 272 may be displayed in region 232C above camera sensor 238 only when the camera is on (e.g., device 2 is executing an image capture application such as a camera application or a video application) and view 270 may be displayed in region 232A. In some examples, view 272 may be displayed in region 232C above camera sensor 238 only when camera sensor 238 is actively being used to capture an image(s) and view 270 (e.g., using all the pixels) may be displayed in region 232A. In some examples, view 270 (e.g., using all the pixels) may be used in region 232A, region 232B, and region 232C when the camera is off. In some examples, view 270 (e.g., using all the pixels) may be used in region 232A, region 232B, and region 232C when camera sensor 234 is not actively being used to capture an image(s). For example, view 272 may be displayed in region 232B when an image capture application (e.g., a camera application or video application) is being executed by device 2.

View 272 may be desirable to display in region 232B when camera sensor 234 is actively being used to capture an image(s) to reduce light scattering and resulting attenuation of the ambient light that may be caused by display content and received by camera sensor 234. Thereby, a subset of pixels in region 232B may be active or addressed when the camera is on or when camera sensor 234 is actively capturing an image(s). Similarly, a subset of pixels in region 232C may be active when the camera is on or when camera sensor 238 is actively capturing an image(s). By reducing the number of pixels above camera sensor 234 (or camera sensor 238) displaying content during image capture, attenuation of light received by camera sensor 234 due to light scattering may be reduced. However, by reducing the number of pixels above camera sensor 234, the image being displayed in region 232B may appear blocky or lacking in detail and distracting, as the resolution (e.g., number of active pixels per unit of area) of region 232B while capturing an image may be reduced compared to region 232A. Because some of the display pixels above the camera sensor may be off or not addressed when the camera is on, the user experience relating to the displayed content in the area over the camera sensor may be relatively poor compared to other areas of the display, where all pixels may be used to display content.

According to the techniques of this disclosure, in some examples, device 2 may control one or more pixels in the area (e.g., region 232B) over the camera sensor (e.g., camera sensor 234) to actively display content during a camera sensor blanking period. In some examples, device 2 may control all of the pixels in the area (e.g., region 232B) over the camera sensor (e.g., camera sensor 234) to display content during a camera sensor blanking period, thereby promoting better image quality in the displayed image.

Figure 6:
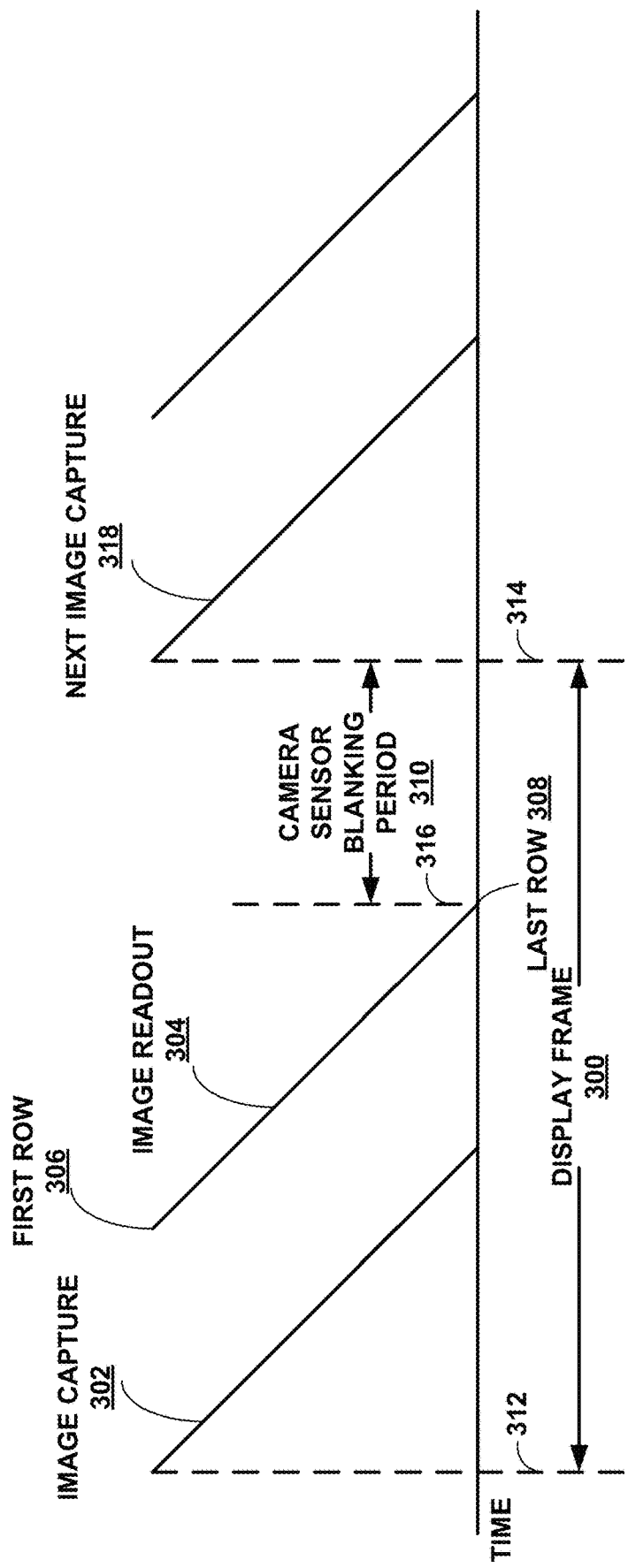
FIG. 6 is a timing diagram illustrating an example display frame and camera sensor blanking period according to the techniques of this disclosure.

FIG. 6 is a timing diagram illustrating an example display frame and camera sensor blanking period according to the techniques of this disclosure. FIG. 6 depicts display frame 300, image capture event 302, image readout event 304, and camera sensor blanking period 310. In some examples, the content being displayed is an image captured by camera sensor 234, such as when a user is taking a "selfie." In the example of FIG. 6, the length of camera sensor blanking period 310 is less than the length of display frame 300. Display frame 300 has a length running from a beginning of the display frame 312 to an end of display frame 314. As such, display frame 300 represents the length of time a frame may be displayed. For example, with a 30 frame per second (fps) display, the length of display frame 300 may equal ⅟₃₀ seconds or approximately 0.033 seconds. For example, with a 60 fps display, the length of display frame 300 may equal ⅟₆₀ seconds or approximately 0.0167 seconds.

In many instances, an image capture event may be shorter than a length of a display frame. During image capture event 302, camera sensor 234 may be capturing an image. In the example where camera sensor 234 is a rolling shutter camera sensor, camera sensor 234 may capture the image row by row over the time indicated by image capture event 302. In the example where camera sensor 234 is a global shutter camera sensor, camera sensor 234 may capture all rows of the image at one time, in which case the length of time of image capture event 302 may be considerably shorter than depicted in FIG. 6.

During image readout event 304, device 2 may be reading out data from camera sensor 234 indicative of the image captured during image capture event 302. In some examples, the readout may be performed row by row, beginning with first row 306 and ending with last row 308. In some examples, image readout event 304 may overlap in time with image capture event 302 as depicted. In other examples, image readout event 304 may not overlap in time with image capture event 302. One such example may be when camera sensor 234 is a global shutter camera sensor.

Image capture event 302 and image readout event 304 may be completed prior to the end of display frame 314. For example, last row 308 may be read out at time 316 which is before end of display frame 314. This time between the end of image readout event 304 at time 316 and the end of display frame 314 may be referred to as camera sensor blanking period 310. Camera sensor blanking period 310 may be a time during display frame 300 when no image is being captured or read out.

In some examples, unlike in the example of FIG. 6, the length of the camera sensor blanking period may not be less than the length of the display frame. For example, in a very bright light situation, with the camera at 30 frames per second (33.33 ms frame time) and an exposure time of 10 ms with a display rate of 60 frames per second (16.67 ms frame time), the camera sensor blanking period may be 23 ms long. In this example, the camera integration duty cycle may be 10 ms (exposure time)/33.33 ms (frame time) which is 30%. Two display frames may fall withing the camera frame time. Out of the two display frames, camera sensor 234 may be on 70% of the time, or 1.4 display frames. In some such examples, the pixel value may be enhanced by 2/1.4 or 1.42 times (e.g., the second level of brightness may be 1.42 times the first level of brightness). In this example, the display pixel value that may be enhanced may be a last display pixel value for that pixel or an average value over the two display frames. In some examples, a camera sensor blanking period may not vary along with auto exposure parameters as some auto exposure parameters may vary without varying an exposure time.

In another example, in a low light situation, the camera frame rate may be 15 frames per second and the camera frame time may be 66.67 ms. In this example, the camera sensor blanking period may be small, such as 2 ms and the exposure time may be 64.67 ms. The camera integration duty cycle may be 64.67 ms (exposure time)/66.67 ms (frame time) or 97%. In this example, there may be 4 display frames may fall within a given camera frame time. Out of 4 display frames, the display pixel may be on or addressed for only 3% of the time or 0.12 display frames. In this example, the pixel value may be enhanced by 4/0.12 or 33.33 times (e.g., the second level of brightness may be 33.33 times the first level of brightness). In this example, the display pixel value that may be enhanced may be a last display pixel value for that pixel or an average value over the four display frames.

Figure 7:
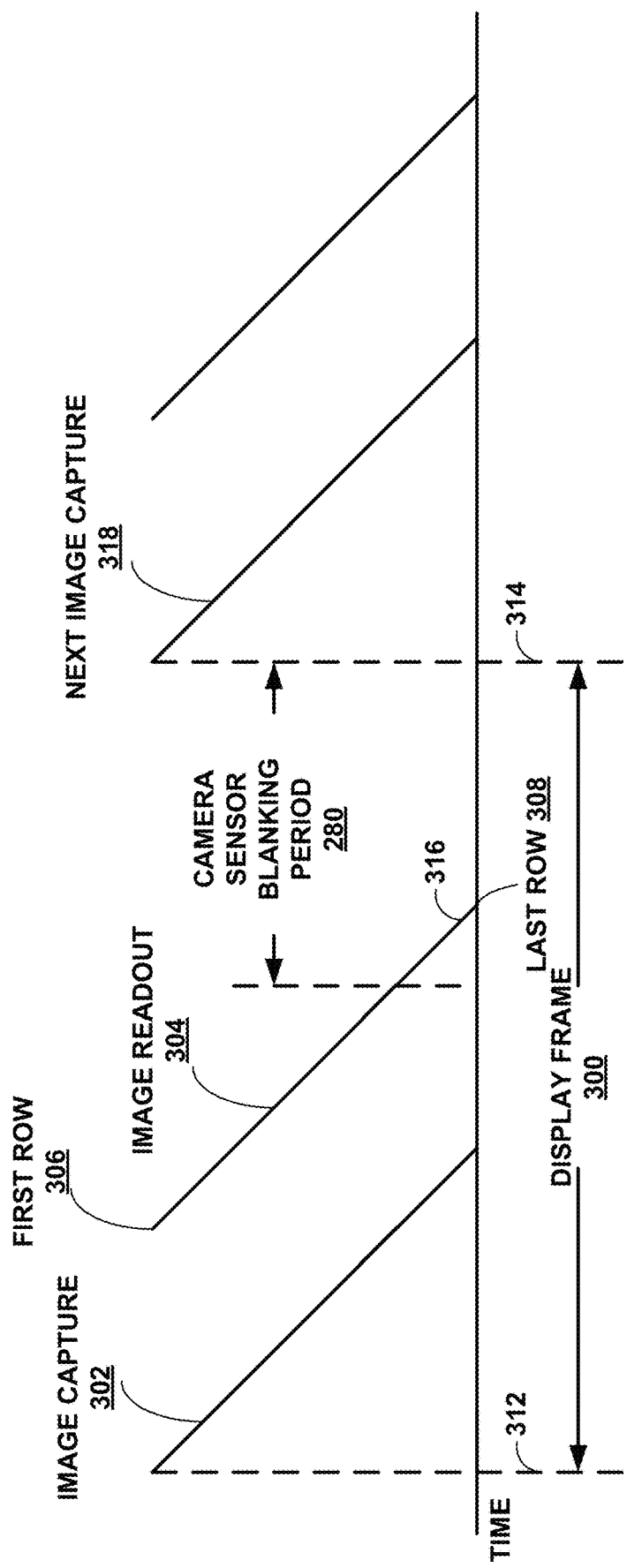
FIG. 7 is a timing diagram illustrating another example display frame and camera sensor blanking period according to the techniques of this disclosure.

FIG. 7 is a timing diagram illustrating an example display frame and camera sensor blanking period according to the techniques of this disclosure. FIG. 7 depicts display frame 300, image capture event 302, image readout event 304, and camera sensor blanking period 280. In the example of FIG. 7, camera sensor blanking period 280 overlaps with image readout event 304. The example of FIG. 7 otherwise is similar to the example of FIG. 6. During camera sensor blanking period 280, a pixel in region 232B may display a pixel value of a second level of brightness according to the techniques of this disclosure.

Figure 8:
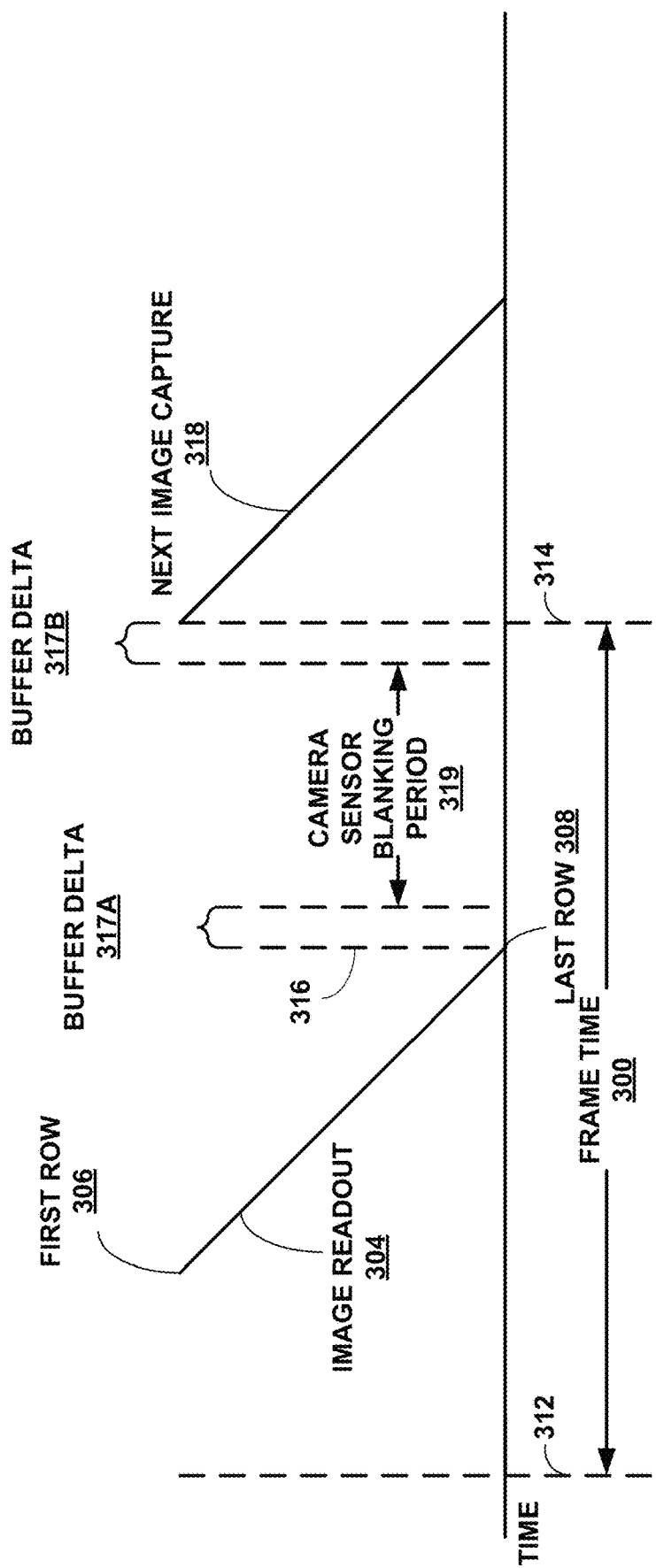
FIG. 8 is a timing diagram illustrating an example display frame, buffer delta(s), and camera sensor blanking period according to the techniques of this disclosure.

FIG. 8 is a timing diagram illustrating an example display frame, buffer delta(s), and camera sensor blanking period according to the techniques of this disclosure. In some examples, a buffer delta, such as buffer delta 317A or buffer delta 317B may be used with a camera sensor blanking period, such as camera sensor blanking period 319, to provide separation between the camera sensor blanking period and image readout event 304 and/or next image capture event 318. As such, camera sensor blanking period 319 of FIG. 8 may be shorter than camera sensor blanking period 310 of FIG. 6 or camera sensor blanking period 280 of FIG. 7.

For example, if a current exposure time is 10 ms and the frame time is 33 ms, the blanking time may equal to the frame time minus the exposure time minus the buffer delta. If a 3 ms buffer delta is used, the camera sensor blanking period may equal 33 ms−10 ms−3 ms=20 ms. In some examples, the buffer delta, e.g., buffer delta 317A, may be immediately after last row 308 is read out (time 316). In some example, the buffer delta, e.g., buffer delta 317B, may be immediately before the beginning of the next image capture event 318 (e.g., at the time of end of display frame 314). In some examples, the buffer delta may be split between immediately after last row 308 is read out (time 316) and immediately before the beginning of the next image capture event 318 (e.g., at the time of end of display frame 314) or two buffer deltas may be used with one immediately after last row 308 is read out (time 316), e.g., buffer delta 317A, and one immediately before the beginning of the next image capture event 318 (e.g., at the time of end of display frame 314), e.g., buffer delta 317B. A buffer delta, such as buffer delta 317A or buffer delta 317B may provide some protection against latency between an image capture event and an image readout event of camera sensor 234 and display of content on pixels in region 232B of display 232 over camera sensor 234. This latency may otherwise cause the display of content in pixels in region 232B while an image capture event or image readout event is occurring.

FIGS. 9A-9B are conceptual diagrams illustrating example display techniques according to this disclosure. In FIG. 9A, the horizontal axis represents time and the vertical axis represents a level of brightness. A display pixel in an area, such as region 232B, over a camera sensor, such as camera sensor 234, is on during time 320, which may be camera sensor blanking period 340 or a portion of a camera sensor blanking period. During integration time 322, the pixel is off or not addressed (e.g., not displaying content). For example, device 2 may not display a portion of content in the pixel outside of the camera sensor blanking period (e.g., outside of camera sensor blanking period 340 and camera sensor blanking period 342). In some examples, integration time 322 includes time during which camera sensor 234 is actively capturing an image. In some examples, integration time 322 includes time during which camera sensor 234 is actively capturing an image and time during which device 2 is reading data out of camera sensor 234. In some examples, integration time 322 includes time during which camera sensor 234 is actively capturing an image, time during which device 2 is reading data out of camera sensor 234, and one or more buffer deltas (e.g., buffer delta 317A or buffer delta 317B). As the pixel is off or not addressed while camera sensor 234 is actively capturing an image, device 2 may avoid or mitigate light scattering and the resulting attenuation of received light caused by the displayed content in the pixel. After integration time 322, the pixel may be turned on or addressed again during time 324, which may be camera sensor blanking period 342 or a portion of a camera sensor blanking period.

In some examples, each of the pixels in the area over the camera sensor, such as region 232B, may be on or addressed during times 320 and 324, and off or not addressed during integration time 322. In this manner, the pixels in region 232B over camera sensor 234 may be off or not addressed while camera sensor 234 is actively capturing an image, thereby mitigating or avoiding light scattering and the resulting attenuation of received light caused by the displayed content.

In the example of FIG. 9A, the level of brightness of the pixel when the pixel is on or addressed is equal to the first level of brightness 326 for the pixel. For example, if the first level of brightness is a gray value of 30, when the pixel is on or addressed during time 320 the pixel displays a level of brightness of a gray value of 30.

The human eye may act like a low pass filter. For example, fluorescent lights flash during normal use, but a human may not perceive the flashing. Instead, the human may perceive a steady level of brightness which may equate to an average level of brightness of the fluorescent light being on and the fluorescent light being off. As such, a user of device 2 in the example of FIG. 9A may perceive the brightness of the pixel to be perceived brightness 328. That is, a user may not perceive the first level of brightness 326, but may instead perceive an average level of brightness. This average level of brightness, perceived brightness 328, may be equal to or approximately equal to an average of the brightness of the pixel when the pixel is on or being addressed and zero when the pixel is off or not being addressed, during a given display frame. Thus, in the example of FIG. 8A, region 232B may appear less bright than region 232A, which may be distracting or aesthetically unpleasant to a user of device 2.

According to the techniques of this disclosure, device 2 may increase pixel brightness during the camera sensor blanking period to maintain the average brightness level so that the average brightness level is equal or approximately equal to the first level of brightness the pixel would have if the camera was off. As such, the average brightness level may be the same as or close to the brightness level of surrounding pixels.

In FIG. 9B, the horizontal axis represents time and the vertical axis represents a level of brightness. A display pixel in an area, such as region 232B over a camera sensor, such as camera sensor 234, is on or addressed during time 330, which may be camera sensor blanking period 350 or a portion of a camera sensor blanking period. During integration time 332, the pixel is off or not addressed (e.g., not displaying content). For example, device 2 may not display a portion of the image in the pixel outside of the camera sensor blanking period (e.g., camera sensor blanking period 350 and camera sensor blanking period 352). In some examples, integration time 332 includes time during which camera sensor 234 is actively capturing an image. In some examples, integration time 332 includes time during which camera sensor 234 is actively capturing an image and time during which device 2 is reading data out of camera sensor 234. In some examples, integration time 332 includes time during which camera sensor 234 is actively capturing an image, time during which device 2 is reading data out of camera sensor 234, and one or more buffer deltas (e.g., buffer delta 317A or buffer delta 317B).

In some examples, each of the pixels in the area over the camera sensor, such as region 232B, may be on or addressed during times 330 and 334, and off or not addressed during integration time 332. In this manner, the pixels in region 232B over camera sensor 234 may be off or not addressed while camera sensor 234 is actively capturing an image, thereby mitigating or avoiding light scattering and the resulting attenuation of received light caused by the displayed content.

In the example of FIG. 9B, the level of brightness of the pixel above the camera sensor is at second level of brightness 337. Second level of brightness 337 is higher than first level of level of brightness 326 in the example of FIG. 9A. In some examples, second level of brightness 337 for the pixel above the camera sensor may be determined such that the first level of brightness 336 (e.g., the gray value assigned for that pixel) may equal or approximately equal perceived brightness 338. For example, device 2 may determine a second level of brightness for the pixel.

The information used to implement the techniques of this disclosure may be readily available to device 2. For example, the start of a frame, the end of a frame, the exposure time, etc., may be readily available. The information relating to camera sensor 234 such as the beginning of an image capture event, the end of an image capture event, the beginning of an image readout event, the end of an image readout event, and a next frame exposure time may also be readily available to device 2. In some examples, camera sensor 234 may output an on/off signal to a pin and a display controller (which may be an example of one or more processors 110) may treat this as an event to control. For example, an on signal may indicate a camera sensor blanking period and an off signal may indicate integration time.

For example, device 2 may have information relating to the exposure time (e.g., from AEC process 20 of FIG. 1) of camera sensor 234. Device 2 may also have information relating to the length of the display frame 300 (FIGS. 6-8). From this information, device 2 may determine a length of a camera sensor blanking period (e.g., camera sensor blanking period 310 of FIG. 6, camera sensor blanking period 280 of FIG. 7, or camera sensor blanking period 319 of FIG. 8). One or more processors of device 2 may use the length of the camera sensor blanking period length and the length of the display frame to determine what percentage of the time during a display frame the pixel is on or being addressed (e.g., determine the duty cycle of the pixel during a display frame). For example, a pixel may be on or addressed 50% of the time (0.5). Device 2 may also have information on what the first level of brightness is for the pixel, for example, a gray value of 30. One or more processors of device 2 may determine the second level of brightness to use for the pixel by dividing the first level of brightness by the percentage of time the pixel is on or addressed during a display frame. For example, one or more processors of device 2 may determine the second level of brightness to be a gray value of 60 by dividing the first level of brightness for the pixel (gray value of 30) by the percentage of time (0.5) the pixel is on or being addressed during a display frame.

In another example, the pixel is on or being addressed 25% of the time (0.25) during a display frame and the first level of brightness is a gray value of 30. In this example, one or more processors of device 2 may determine the second level of brightness for the pixel to be a gray value of 120 by dividing the gray value of 30 by the percentage of time the pixel is on or being addressed during a display frame, 0.25. In this manner, perceived brightness 338 perceived by a user may equal or approximately equal the first level of brightness 336 of the portion of the image to be displayed by the pixel. In some examples, one or more processors of device 2 may determine a second level of brightness for each of the pixels above the camera sensor (e.g., in region 232B or region 232C of FIG. 2D). As such, the techniques of this disclosure may not only avoid or mitigate attenuation of light received by camera sensor 234 due to light scattering caused by the displayed content, but may also facilitate the display of content during a display frame when the camera is on that may appear the same or approximately the same as the content would appear if the same content were to be displayed during a display frame when the camera is off.

In some examples, one or more processors of device 2 may determine a second level of brightness using the following formula:

$$SB=(DF/BP)*FB$$

where SB is the second level of brightness, DF is a length of a display frame, BP is a length of the camera sensor blanking period and FB is the first level of brightness. In some examples, one or more processors of device 2 may determine the second level of brightness using the following formula:

$$SB=(DF/BP)*FB*W$$

where SB is the second level of brightness, DF is a length of a display frame, BP is a length of the camera sensor blanking period, FB is the first level of brightness, and W is a weighting coefficient. In some examples, one or more processors of device 2 may use another calculation to determine the second level of brightness. For example, one or more processors of device 2 may use a gaussian function to determine the second level of brightness.

Figure 10:
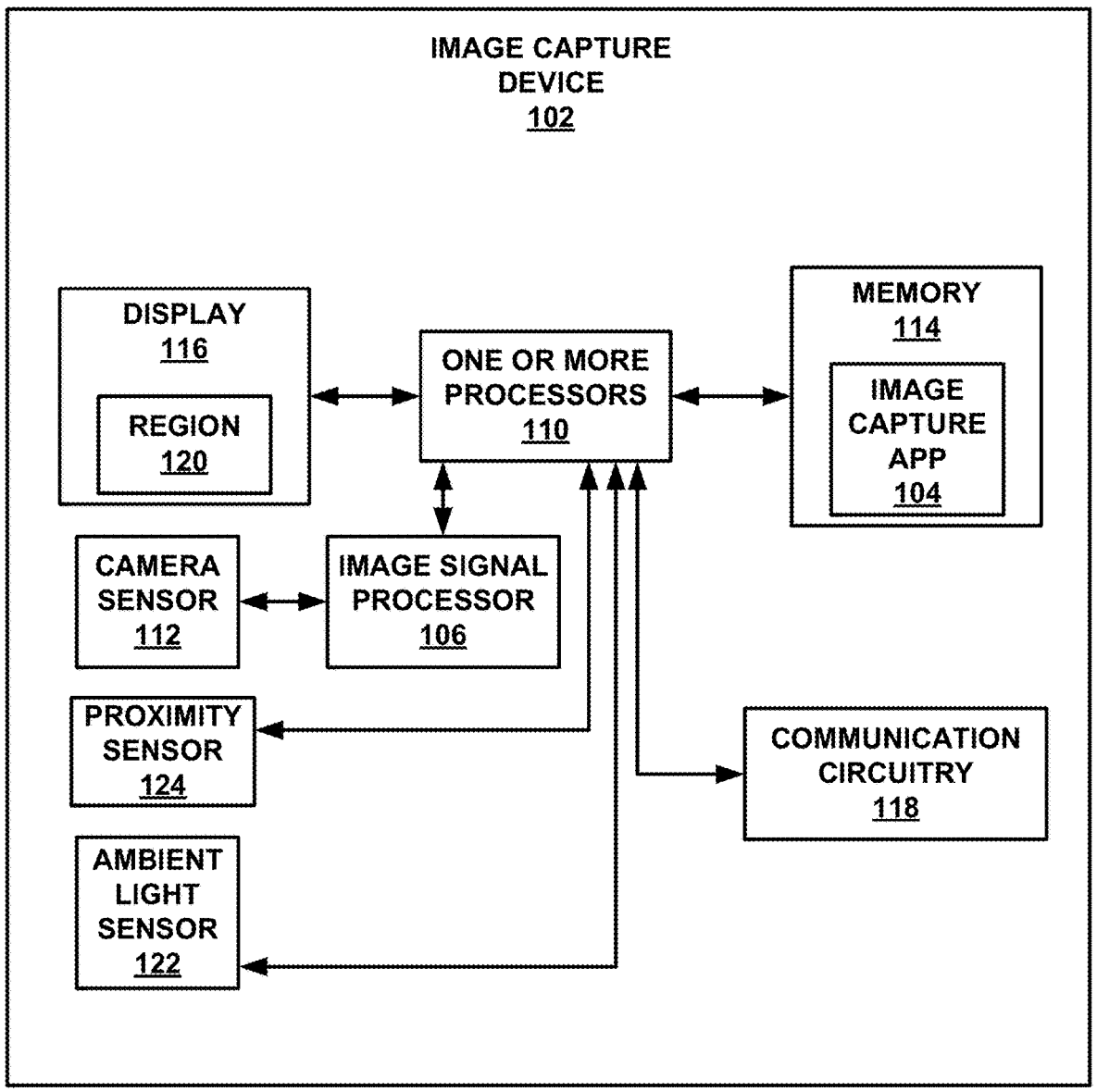
FIG. 10 is a block diagram of an example image capture device that may implement the techniques of this disclosure.

FIG. 10 is a block diagram of an example image capture device that may implement the techniques of this disclosure. Image capture device 102 may be an example of, and may substantially conform to, device 2 of FIG. 1. By way of example, image capture device 102 may comprise a wireless mobile communication device such as a cellular phone or satellite radio phone, a smartphone, a stand-alone digital camera or video camcorder, a personal digital assistant (PDA), a tablet computer, a laptop computer, or any device with imaging or video capabilities in which image processing is desirable.

Image capture device 102 may include one or more processors 110, camera sensor 112, image signal processor 106, memory 114, display 116, communication circuitry 118, ambient light sensor 122, and proximity sensor 124. Display 116 may include a region 120 (which may be an example of region 232B or region 232C of FIG. 2D) located over camera sensor 112. In some examples, one of or both of ambient light sensor 122 or proximity sensor 124 may be located under display 116. In some examples, one of or both of ambient light sensor 122 or proximity sensor 124 may be located under region 120. In some examples, one of or both of ambient light sensor 122 and proximity sensor may be utilized by image signal processor 106 or one or more processors 110 to determine an exposure time for camera sensor 112 or determine an autofocus for camera sensor 234. In some examples, the techniques of this disclosure discussed with respect to camera sensors, such as camera sensor 112, may be used for ambient light sensor 122 or proximity sensor 124. For example, ambient light sensor 122 may sense an amount of ambient light while display 116 is not displaying content. Similarly, proximity sensor 124 may emit infra-red light while display 116 is not displaying content. In some examples, image signal processor 106 may be one of one or more processors 110. In some examples, image signal processor 106 may be more than one of one or more processors. In some examples, image signal processor 106 may be separate from one or more processors 110, as depicted.

Memory 114 may include an image capture application (image capture app) 104 for execution by one or more processors 110. Image capture application 104 may be utilized by a user to turn on the camera functionality of image capture device 102. Memory 114 may also be configured to store pixel values relating to an image captured by camera sensor 112. Memory 114 may also store instructions for causing one or more processors 110 to perform the techniques of this disclosure.

Camera sensor 112 may capture an image during an image capture event, such as image capture event 302 of FIGS. 6-7. For example, camera sensor 112 may capture values of pixels when capturing the image. In some examples, the captured values may include levels of brightness or the captured values may be convertible to include levels of brightness. Image signal processor 106 may process the captured or converted values as discussed above with respect to image signal processor 6 of FIG. 1. The level of brightness for a given pixel either as captured by camera sensor 112, as processed by image signal processor 106, as otherwise received by image capture device 102, may be a first level of brightness.

One or more processors 110 may obtain the pixel values from image signal processor 106 and may provide the pixel values to memory 114 for storage, to communication circuitry 118 for transmittal to another device, and/or provide the pixel values to display 116 for display. When the camera is off, one or more processors 110 may obtain the pixel values from memory 114, for example, and provide the pixel values to display 116 for display.

When the camera is on, one or more processors 110 may enhance the first level of brightness for pixels of region 120. For example, one or more processors 110 may determine a first level of brightness for a pixel, the pixel being located in a region of a display above a camera sensor. One or more processors 110 may determine a length of a camera sensor blanking period. One or more processors 110 may determine a length of a display frame. One or more processors 110 may determine a second level of brightness based on the first level of brightness, the length of the camera sensor blanking period, and the length of the display frame. One or more processors 110 may display a portion of the image in the pixel at the second level of brightness during the camera sensor blanking period.

One or more processors 110 may control display 116 such that, when the camera is on, pixels in region 120 are only used to display content during a camera sensor blanking period. When the camera is off, one or more processors 110 may control display 116 to display content in pixels, including the pixels of region 120, during an entire frame.

Figure 11:
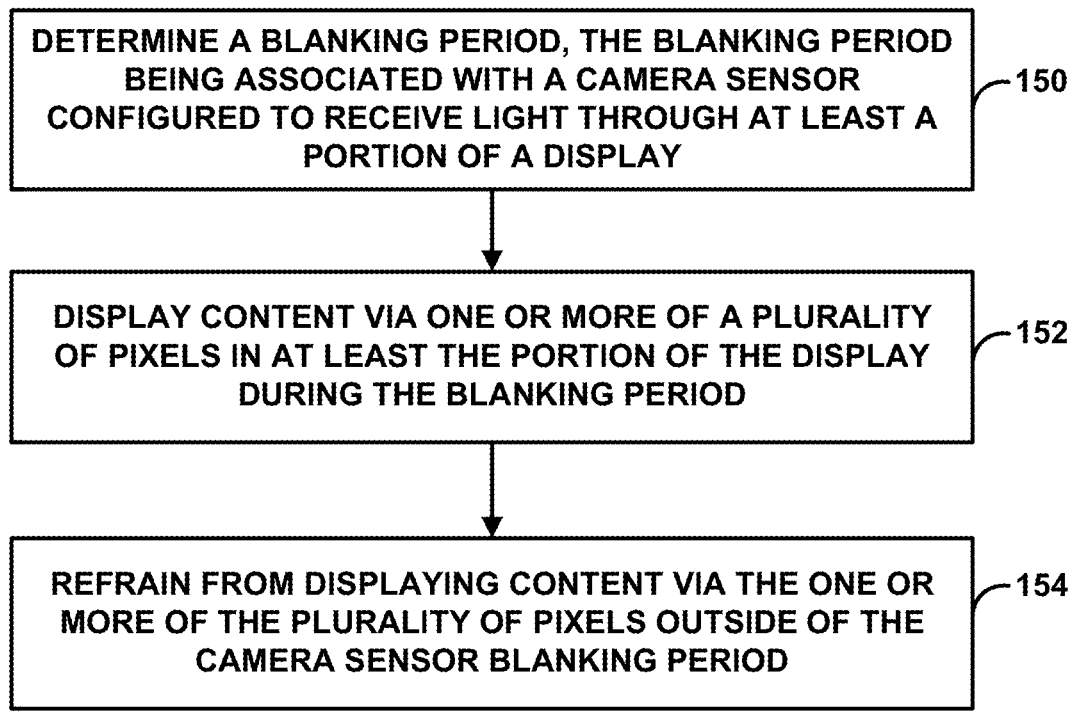
FIG. 11 is a flowchart illustrating example techniques for displaying content in an image capture device having an under-display camera sensor according to this disclosure.

FIG. 11 is a flowchart illustrating example techniques for displaying content in an image capture device having an under-display camera sensor according to this disclosure. One or more processors 110 may determine a camera sensor blanking period (e.g., camera sensor blanking period 310), the camera sensor blanking period being associated with a camera sensor configured to receive light through at least a portion (e.g., region 120) of display 116 (150). For example, one or more processors 110 may determine the camera sensor blanking period to be a time at which a camera or image capture application is on (e.g., image capture application 104 is being executed by one or more processors 110) and camera sensor 112 is not capturing an image. In another example, one or more processors 110 may determine the camera sensor blanking period to be a time at which the camera or image capture application is on (e.g., image capture application 104 is being executed by one or more processors 110), camera sensor 112 is not capturing the image, and one or more processors 110 are not reading data out from camera sensor 112. In some examples, one or more processors 110 may determine the camera sensor blanking period such that the camera sensor blanking period does not include a time during a buffer delta (e.g., buffer delta 317A or buffer delta 317B).

One or more processors 110 may control display 116 to display content via one or more of a plurality of pixels in the at least a portion (e.g., region 120) of display 116 during the camera sensor blanking period (e.g., camera sensor blanking period 310) (152). For example, region 120 of display 116 may display content during the camera sensor blanking period, such as an image captured by image capture device 102, visual representations of files stored in a memory location, software applications, user interfaces including GUIs, network-accessible content objects, images received by, but not captured by the image capture device (e.g., downloaded images, images sent by text message, images sent by email, images sent through an application, etc.), background images, and other information.

One or more processors 110 may control display 116 to refrain from displaying content via the one or more of the plurality of pixels in region 120 outside of the camera sensor blanking period (154). For example, the one or more of the plurality of pixels in region 120 may not actively display content outside of the camera sensor blanking period. In some examples, one or more processors 110 may control display 116 to cease to display content via the one or more of the plurality of pixels in region 120 at an end of the camera sensor blanking period. In some examples, the display may not display content via the one or more of the plurality of pixels in region 120 until the beginning of another camera sensor blanking period. In some examples, the camera sensor blanking period is a first camera sensor blanking period, and one or more processors 110 may determine a second camera sensor blanking period and control display 116 to display content via the one or more of a plurality of pixels in region 120 during the second camera sensor blanking period.

In some examples, one or more processors 110 may determine a first level of brightness of the one or more of the plurality of pixels in region 120. For example, one or more processors 110 may determine the first level of brightness for the one or more of the plurality of pixels by reading a level of brightness value for each of the one or more of the plurality of pixels from camera sensor 112. In another example, one or more processors 110 may determine the first level of brightness for the one or more of the plurality of pixels by reading a level of brightness value for each of the one or more of the plurality of pixels from image signal processor 106. In another example, one or more processors 110 may determine the first level of brightness for the one or more of the plurality of pixels by reading a level of brightness for each of the one or more of the plurality of pixels from memory 114. In another example, one or more processors 110 may determine the first level of brightness for the one or more of the plurality of pixels by determining a level of brightness for a pixel outside of region 120. In yet another example, one or more processors 110 may determine the first level of brightness for the one or more of the plurality of pixels by determining an average level of brightness for a plurality of pixels outside of region 120. In some examples, the first level of brightness is a level of brightness the image capture device displays when a camera or image capture application of the image capture device is off.

In some examples, one or more processors 110 may determine a second level of brightness of the one or more of the plurality of pixels in region 120. In some examples, the second level of brightness is greater than the first level of brightness and is based at least in part on the first level of brightness. For example, one or more processors 110 may determine a length of the camera sensor blanking period and determine a length of a display frame of the content. For example, one or more processors 110 may have information relating to the exposure time of camera sensor 112 and information relating to the length of the display frame and may use this information to determine the length of the camera sensor blanking period. In some examples, the second level of brightness is further based on the length of the camera sensor blanking period and the length of the display frame. In some examples, the second level of brightness is based on the display content and the first level of brightness. In some examples, the length of the camera sensor blanking period is less than the length of the display frame.

In some examples, as part of determining the second level of brightness, one or more processors 110 apply a formula to the first level of brightness. In some examples, the formula comprises a gaussian function. In some examples, the formula is:

$$SB=(DF/BP)*FB$$

where SB is the second level of brightness, DF is a length of a display frame, BP is a length of the camera sensor blanking period and FB is the first level of brightness. In some examples, the formula is:

$$SB=(DF/BP)*FB*W$$

where SB is the second level of brightness, DF is a length of a display frame, BP is a length of the camera sensor blanking period, FB is the first level of brightness, and W is a weighting coefficient.

In some examples, one or more processors 110 may control display 116 to display content via the one or more of the plurality of pixels at the second level of brightness during the camera sensor blanking period. For example, the one or more of the plurality of pixels in region 120 may display content at the second level of brightness. In some examples, the second level of brightness is greater than the first level of brightness and is based at least in part on the first level of brightness.

In some examples, the content is at least a portion of an image captured by camera sensor 112. In some examples, image capture device 102 is a wireless mobile communication device, such as a smart phone or cellular phone. In some examples, image capture device 102 includes camera sensor 112 and display 116.

Thus, by determining a second level of brightness, and applying that second level of brightness to a pixel during a camera sensor blanking period, a camera sensor may be located under a display so as to try to maximize display size on an image capture device without otherwise presenting image quality issues. By locating the camera sensor under the screen, the screen size of the image capture device may be larger than a same sized image capture device using a notched screen and the reliability of image capture device may be improved over the reliability of an image capture device using a pop-up camera with moveable mechanical parts.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An image capture device comprising:
   memory configured to store display content and image information received from a camera sensor, the camera sensor being configured to receive light through at least a portion of a display; and
   one or more processors being coupled to the memory, the one or more processors being configured to:

determine a camera sensor blanking period;
determine a first level of brightness for one or more of a first plurality of pixels outside of the portion of the display through which the camera sensor receives light;
determine a second level of brightness for one or more of a second plurality of pixels in the portion of the display through which the camera sensor receives light, wherein the second level of brightness is greater than the first level of brightness and is based at least in part on the first level of brightness;
control the display to display content via the one or more of the second plurality of pixels at the second brightness level during the camera sensor blanking period; and
control the display to not display content via the one or more of the second plurality of pixels outside of the camera sensor blanking period.

2. The image capture device of claim 1, wherein the one or more processors are further configured to:
control the display to cease displaying content via the one or more of the second plurality of pixels at an end of the camera sensor blanking period.

3. The image capture device of claim 2, wherein the camera sensor blanking period is a first camera sensor blanking period, and one or more processors are further configured to:
determine a second camera sensor blanking period; and
control the display to display content via the one or more of the second plurality of pixels during the second camera sensor blanking period.

4. The image capture device of claim 1, wherein the first level of brightness is a level of brightness the image capture device displays when an image capture application of the image capture device is off.

5. The image capture device of claim 4, wherein as part of determining the second level of brightness, the one or more processors are configured to:
determine a length of the camera sensor blanking period; and
determine a length of a display frame of the content,
wherein the second level of brightness is further based on the length of the camera sensor blanking period and the length of the display frame.

6. The image capture device of claim 5, wherein the length of the camera sensor blanking period is less than the length of the display frame.

7. The image capture device of claim 5, wherein the second level of brightness is based on the display content and the first level of brightness.

8. The image capture device of claim 5, wherein, as part of determining the second level of brightness, the one or more processors apply a gaussian function to the first level of brightness.

9. The image capture device of claim 5, wherein the one or more processors determine the second level of brightness by determining:

$$SB=(DF/BP)*FB$$

where SB is the second level of brightness, DF is a length of a display frame, BP is a length of the camera sensor blanking period and FB is the first level of brightness.

10. The image capture device of claim 5, wherein the one or more processors determine the second level of brightness by determining:

$$SB=(DF/BP)*FB*W$$

where SB is the second level of brightness, DF is a length of a display frame, BP is a length of the camera sensor blanking period, FB is the first level of brightness, and W is a weighting coefficient.

11. The image capture device of claim 1, wherein the camera sensor blanking period comprises a time at which an image capture application is on and the camera sensor is not capturing an image.

12. The image capture device of claim 11, wherein the camera sensor blanking period further comprises a time at which the one or more processors are not reading data out from the camera sensor.

13. The image capture device of claim 1, wherein the content is at least a portion of an image captured by the camera sensor.

14. The image capture device of claim 1, further comprising:
the camera sensor; and
the display.

15. A method of displaying content on an image capture device, the method comprising:
determining a camera sensor blanking period, the camera sensor blanking period being associated with a camera sensor configured to receive light through a portion of a display;
determining a first level of brightness for one or more of a first plurality of pixels outside of the portion of the display through which the camera sensor receives light
determining a second level of brightness for one or more of a second plurality of pixels in the portion of the display through which the camera sensor receives light, wherein the second level of brightness is greater than the first level of brightness and is based at least in part on the first level of brightness;
displaying content via the one or more of the second plurality of pixels at the second brightness level during the camera sensor blanking period; and
refraining from displaying content via the one or more of the second plurality of pixels outside of the camera sensor blanking period.

16. The method of claim 15, further comprising:
ceasing to display content via the one or more of the second plurality of pixels at an end of the camera sensor blanking period.

17. The method of claim 16, wherein the camera sensor blanking period is a first camera sensor blanking period, further comprising:
determining a second camera sensor blanking period; and
displaying content via the one or more of the second plurality of pixels during the second camera sensor blanking period.

18. The method of claim 15, wherein the first level of brightness is a level of brightness the image capture device displays when an image capture application of the image capture device is off.

19. The method of claim 18, wherein determining the second level of brightness comprises:
determining a length of the camera sensor blanking period; and
determining a length of a display frame of the content,
wherein the second level of brightness is further based on the length of the camera sensor blanking period and the length of the display frame.

20. The method of claim 19, wherein the length of the camera sensor blanking period is less than the length of the display frame.

21. The method of claim 19, wherein the second level of brightness is based on the display content and the first level of brightness.

22. The method of claim 19, wherein determining the second level of brightness comprises applying a gaussian function to the first level of brightness.

23. The method of claim 19, wherein determining the second level of brightness comprises determining:

$$SB=(DF/BP)*FB$$

where SB is the second level of brightness, DF is a length of a display frame, BP is a length of the camera sensor blanking period and FB is the first level of brightness.

24. The method of claim 19, wherein determining the second level of brightness comprises determining:

$$SB=(DF/BP)*FB*W$$

where SB is the second level of brightness, DF is a length of a display frame, BP is a length of the camera sensor blanking period, FB is the first level of brightness, and W is a weighting coefficient.

25. The method of claim 15, wherein the camera sensor blanking period comprises a time at which an image capture application is on and the camera sensor is not capturing an image.

26. The method of claim 25, wherein the camera sensor blanking period further comprises a time at which one or more processors of an image capture device are not reading data out from the camera sensor.

27. The method of claim 15, wherein the content is at least a portion of an image captured by the camera sensor.

28. A non-transitory computer-readable storage medium storing instructions that, when executed, cause one or more processors to:
  determine a camera sensor blanking period, the camera sensor blanking period being associated with a camera sensor configured to receive light through at least a portion of a display;
  determine a first level of brightness for one or more of a first plurality of pixels outside of the portion of the display through which the camera sensor receives light;
  determine a second level of brightness for one or more of a second plurality of pixels in the portion of the display through which the camera sensor receives light, wherein the second level of brightness is greater than the first level of brightness and is based at least in part on the first level of brightness;
  control the display to display content via the one or more of the second plurality of pixels in the at the second brightness level during the camera sensor blanking period; and
  control the display to not display content via the one or more of the second plurality of pixels outside of the camera sensor blanking period.

29. An image capture device comprising:
  means for determining a camera sensor blanking period, the camera sensor blanking period being associated with a camera sensor configured to receive light through at least a portion of a display;
  means for determining a first level of brightness for one or more of a first plurality of pixels outside of the portion of the display through which the camera sensor receives light;
  means for determining a second level of brightness for one or more of a second plurality of pixels in the portion of the display through which the camera sensor receives light, wherein the second level of brightness is greater than the first level of brightness and is based at least in part on the first level of brightness;
  means for controlling the display to display content via the one or more of the second plurality of pixels at the second brightness level during the camera sensor blanking period; and
  means for controlling the display to not display content via the one or more of the second plurality of pixels outside of the camera sensor blanking period.

* * * * *